United States Patent [19]
Connel

[11] 3,851,645
[45] Dec. 3, 1974

[54] INHALATION ANESTHESIA DEVICE
[76] Inventor: Allan A. Connel, P.O. Box 23, Stillwater, Minn. 55082
[22] Filed: Apr. 18, 1973
[21] Appl. No.: 352,338

[52] U.S. Cl.............. 128/188, 128/145.6, 128/197, 128/211
[51] Int. Cl.......................................... A61m 17/00
[58] Field of Search .......... 128/188, 187, 186, 184, 128/194, 197, 209, 210, 211, 212, 192, 203, 145.8, 142.3; 261/63, 101, 104, 78 A, DIG. 65

[56] References Cited
UNITED STATES PATENTS
2,572,199  10/1951  Richards............................ 128/186
FOREIGN PATENTS OR APPLICATIONS
61,080  4/1968  Germany............................ 128/188
154  1892  Great Britain...................... 128/186
390,938  10/1908  France............................... 128/187

Primary Examiner—Richard A. Gaudet
Assistant Examiner—Henry J. Recla
Attorney, Agent, or Firm—Robert M. Dunning

[57] ABSTRACT

A device for inducing anesthesia in animals including a variable supply of air under a variable pressure, a source of oxygen and a flap valve arranged such that either atmospheric air, oxygen, or a mixture of these gases may be supplied to the animal or patient through a vaporizing chamber containing an anesthesia and having a by-pass in parallel relation thereto and including a valve structure controlling the flow of gas through the chamber and by-pass.

9 Claims, 5 Drawing Figures

PATENTED DEC 3 1974  3,851,645

INHALATION ANESTHESIA DEVICE

BACKGROUND OF THE INVENTION

While very complicated and sophisticated devices have been produced for use in anesthetizing humans, such construction cannot usually be used effectively for small animals of one type or another. Furthermore, the cost of equipment used in anesthetizing humans is usually prohibitive in the treatment of small pets such as cats. In order to be practical, anesthetizing equipment for animals of this type must be very simple, and must be extremely flexible in order to combine the anesthetic with oxygen and/or air, in view of the fact that the animals being treated vary tremendously in size and weight.

SUMMARY OF THE INVENTION

It is a purpose of the present invention to provide a small compact device for inducing anesthesia in animals which may be produced at a reasonable cost which is commensurate with the fees which are normally paid for the treatment of pets, and which may be controlled by a single person such as the doctor doing surgery on the animal. In normal practice, the apparatus is provided with a flap valve which permits the entry of atmospheric air into a vaporizer chamber. The device is also provided with a variable supply of air under a variable pressure, and is also designed to receive oxygen from a suitable oxygen tank. The apparatus is so arranged that either atmospheric air, oxygen, or a mixture of these gases may be supplied directly to the animal or patient. Alternatively, the air, oxygen, or combination of these gases may flow through a vaporizing chamber where the gas flows through a plurality of vaporizing discs in which the anesthesia such as methoxyflurane has been adsorbed. The gases passing through this vaporizer chamber pick up the anesthetic in gaseous form, and direct it to the animal being treated.

An important feature of the present invention lies in the provision of a device of the type described including a vaporizer chamber and a by-pass which are arranged in parallel relation. By proper adjustment of the valve controlling the flow through the vaporizer chamber and the by-pass, a proper portion of the gas bearing anesthesia and the pure atmospheric air with or without oxygen may be obtained.

In other words, when the by-pass is fully open, the vaporizing chamber is fully closed, and the air or air oxygen combination passes through the by-pass without picking up any anesthesia. On the other hand, if the by-pass is closed and the passage through the vaporizing chamber is fully open, all of the gas includes the anesthetic liquid picked up in the vaporizing chamber. By properly proportioning the valve controlling the outlets from the by-pass and the vaporizing chamber, a desired mixture may be obtained containing the desired amount of atmospheric air and/or oxygen, oxygen alone, or a mixture of gas and methoxyflurane or the like. Thus the anesthesia content of the gas may be varied within wide limits depending upon the size and condition of the animal being anesthetized.

A further feature of the present invention lies in the provision of a simple device capable of mixing an anesthetic gas such as methoxyflurane with air and/or oxygen or combinations thereof under accurate control, and to deliver the gas containing the anesthetic in a controlled concentration. It is important that the concentration of the anesthetic in the carrier gas or gases may be readily varied from time to time, if desired. This is accomplished by merely varying the proportion of the pure gas being by-passed and the gas passing through the vaporizing chamber so that the amount of anesthetic being delivered may be readily increased or decreased.

In its preferred form, the device may comprise an elongated tubular member having closed ends, and a pair of spaced partitions which are spaced from the inlet end to form an air and oxygen receiving chamber, and which form at the other end a product delivery chamber. A by-pass is provided connecting the receiving chamber and the delivery chamber. A valve is provided adjacent to the product delivery chamber capable of adjustment from a position in which all of the gas is by-passed from the receiving chamber to the delivery chamber, and a second extreme position in which all of the gas passes through the vaporizing chamber which is between the two spaced partitions. This valve may be readily adjusted in position to properly proportion the gases passing through the vaporizing chamber with those passing through the by-pass so as to produce a desired proportion of anesthetic.

A further feature of the invention lies in the provision of a vaporizing chamber between the partitions which includes a series of spaced discs of fiberglass or similar material which is capable of absorbing the anesthetic so that air passing through these four discs will pick up the anesthetic and so that this gas will include a predetermined concentration of the anesthetic.

A further feature of the present invention resides in the provision of an elongated tube or compartment of the type described having a filler tube communicating with the vaporizing chamber into which a measured amount of the liquid anesthetic may be poured, the liquid pooling at the bottom of the chamber in contact with the spaced fiberglass discs. The discs are held in properly spaced relation by spacer rings and held normal to the axis of the tube. In preferred form, baffles are provided to direct the gases passing through the vaporizing chamber toward the lower portion of the fiberglass discs which absorb the liquid anesthetic more quickly than the upper portions thereof, thereby providing regulation for the amount of anesthetic picked up, to insure the prompt operation of the apparatus shortly after the liquid anesthetic is introduced to the vaporizing chamber.

The evaporation of the liquid anesthetic has a tendency to cool the unit, and to accordingly cool the gases passing through. Accordingly, a small thermostatically controlled heater tape is provided encircling the vaporizing chamber so that the temperature within the chamber may be maintained within predetermined limits, such as between 73°F and 78°F.

A further feature of the present invention resides in the provision of a simple pump which is designed to deliver an adjustable amount of air to the receiving chamber of the apparatus. The pump is preferably designed to furnish a predetermined volume of air. However, a bleed valve is provided so that the volume of air may be greatly reduced whenever it is so desired.

A further feature of the present invention resides in the provision of a flap valve in the receiving chamber through which atmospheric air may flow to supply air to animals of large size. The air pump is provided for use when smaller animals are being treated. The flow of oxygen into the receiving chamber is readily variable from the supply.

These and other objects and novel features of the present invention will be more clearly and fully set forth in the following specification and claims.

DESCRIPTION OF THE PREFERRED EMBODIMENT

Figure 1:
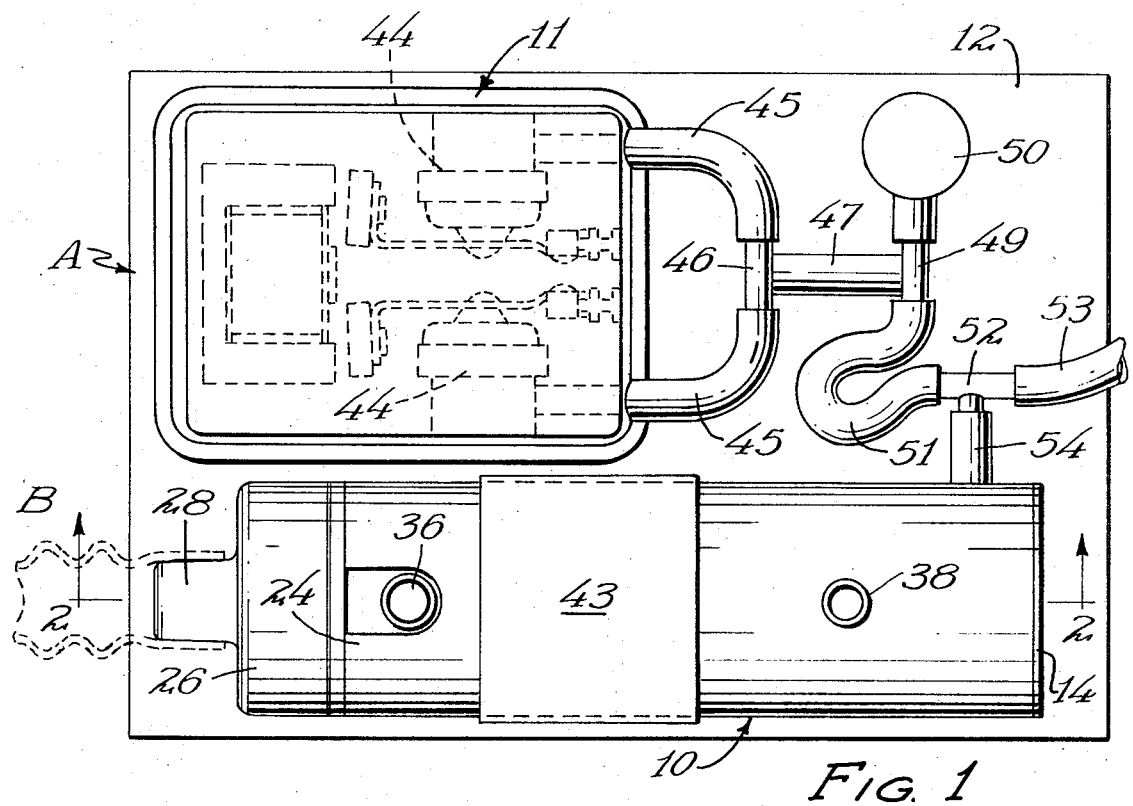
FIG. 1 is a top plan view of the apparatus including the air pump in diagramatic form and the vaporizing and mixing element.

As indicated in FIG. 1 of the drawings, the apparatus shown diagramatically in FIG. 1 of the drawings is indicated in general by the numeral A, and includes a mixing and vaporizing unit 10, and an air pump 11 mounted upon a common base panel 12. The apparatus is normally enclosed within a cover and an electrical connection to the pump is provided which is also not specifically illustrated.

Figure 2:
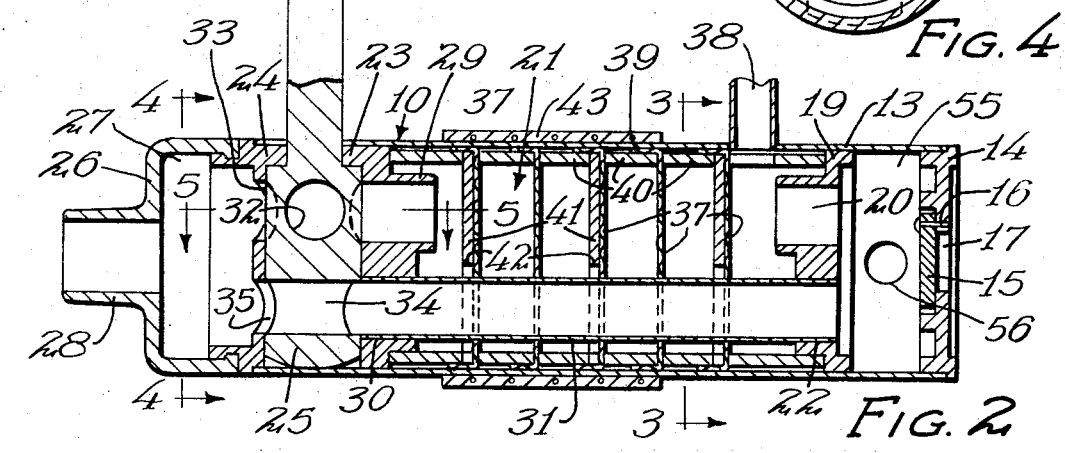
FIG. 2 is a vertical sectional view through the vaporizing and mixing unit.

With reference to FIG. 2 of the drawings, the vaporizing chamber 10 includes an elongated cylindrical tube 13 which may be of copper or other suitable material. An end plug 14 is provided as an end closure for one end of the tube 13. A flexible flap valve 15 is pinned or otherwise secured as indicated at 16 to the plug 14, and normally closes an axial aperture 17 through the plug 14. The flap valve 15 may be opened by the inhalation of the animal where only air is used as the gaseous medium, and where the animal is of sufficient size to cause the flap valve to swing inwardly.

A partition wall 19 is provided within the tube 13 in spaced relation to the end plug 14. This partition 19 is provided with an inlet passage 20 through which the gas may enter the vaporizing chamber which is indicated in general by the numeral 21. The partition 19 is also provided with a second aperture 22 for a purpose which will be described. A second partition member 23 is provided adjoining the outlet or discharge end of the tube 10, and includes a cylindrical valve housing 24 which supports a cylindrical valve 25. An end cap 26 having an axial delivery passage 27 is detachably secured to the partition member 23, forming a delivery chamber 27 between the partition 23 and the outlet 28 designed for connection with a flexible tube B leading to an anesthetizing mask or the like.

The partition member 23 is provided with an inlet sleeve 29, and a second inlet aperture 30 which is in aligned relation to the aperture 22. A by-pass tube 31 extends from one partition 19 to the other partition 23. The valve 25 is provided with an upper passage 32 extending therethrough which is designed, in one position of the valve, to connect the passage 29 with an opening 33 communicating with the delivery chamber 27. The valve 25 is also provided with a lower opening 34 which functions, in the position of the valve indicated in FIG. 2, to connect the by-pass passage 31 to an aperture 35 in the valve housing 24 communicating with the delivery chamber 27. By rotating the valve 25, by rotation of the valve stem 36, the passage from the by-pass 31 may be completely closed, completely opened, or partially opened in intermediate positions. In the same manner, the flow between the passage 29 and the aperture 33 may be completely closed, as illustrated in FIG. 2, or completely opened. The valve may also be rotated into intermediate position to proportion the openings from the by-pass tube 31 and the vaporizing chamber 21 and the delivery chamber 27.

As indicated, cup-shaped discs of fiberglass or other foraminous absorbant material are supported on parallel plains normal to the axis of the tube 10 between the partitions 19 and 23. The ring-shaped flanges 39 encircling the periphery of the discs 37 engage against the inner surface of the tube 10. Spacer rings 40 extend between the discs to hold them in parallel spaced relation. Partition baffles 41 having arcuate outer peripheries and horizontally extending lower edges 42 are provided in spaced relation along certain of the discs 37 in order to deflect the gases passing through the vaporizing chamber 21 downwardly toward the lower portions of certain of the discs to insure a uniform concentration of anesthetic as the gas passes through the vaporizing chamber. An inlet for the liquid anesthetic fluid is indicated at 38 so that the elongated chamber (between partitions 19 and 23) may be filled to a suitable level.

The vaporization of the liquid anesthetic has a tendency to cool the interior of the vaporizing chamber. Accordingly, a heating tape 43 is provided encircling the tube 10 outwardly of this vaporizing chamber 21. The heating tape is thermostatically controlled to maintain the internal temperature of this chamber between suitable temperature limits such as between 73° and 78° F. In view of the fact that thermostatic controls of this type are well known in the art, they are not shown in the drawings.

With reference back to FIG. 1 of the drawings, it will be noted that the pump 11 has two opposed bellows type compressors 44 which alternately pump air through connections 45 to a T connection 46, the stem 47 of which is connected as the stem of a second T connector 49. One end of the cross member of the T connection 49 is connected to a bleed valve 50, while the other end of this cross member of the T 49 is connected by a conduit 51 to one end of the cross member of the third T connector 52. An oxygen supply tube 53 in connected to the opposite end of the cross member of the T connection 52, and the stem of this member is connected to a tube 54 leading to the interior of the receiving chamber 55 illustrated at the right hand end of FIG. 2. The inner end of the member 54 is indicated by the aperture 56 in FIG. 2. Obviously, when the pump 11 is in operation, the air discharge from the pump may be delivered to the receiving chamber 55. Also, the oxygen tube 53 which leads to a source of supply of oxygen (not shown) may be directed to the receiving chamber 55.

The pump 11 is designed to pump fluid into the receiving chamber 55 at a constant volume. For example, the pump 11 may be capable of supplying 4 liters of air per minute to the receiving chamber 55. The bleed valve 50 is adjustable to bleed a desired proportion of the pump air so as to decrease the volume of air entering the receiving chamber to at lease one-fourth the normal capacity of the pump 11.

Figure 5:
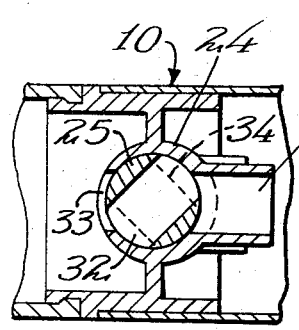
FIG. 5 is a horizontal sectional view through a portion of the control valve, the position of the section being indicated by the line 5—5 of FIG. 2.
Figure 3:
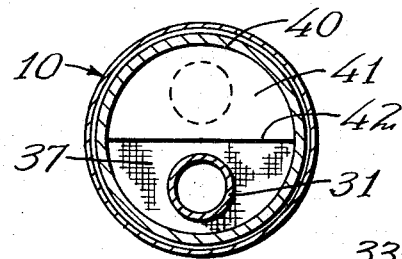
FIG. 3 is a vertical sectional view through the vaporizing chamber, the position of the section being indicated by the line 3—3 of FIG. 2.
Figure 4:
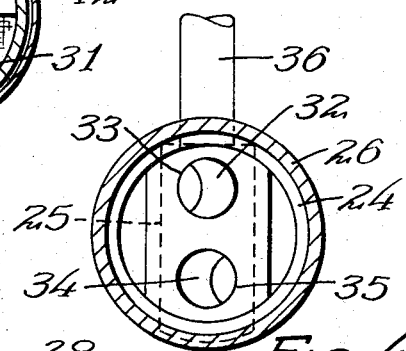
FIG. 4 is a vertical sectional view through the delivery chamber of the apparatus, the position of the section being indicated by the line 4—4 of FIG. 2.

The operation of the apparatus is believed obvious from the forgoing description. When used for smaller animals, or when oxygen is being used, air flows from the pump 47 into the receiving chamber 55. In the position shown in FIG. 2 of the drawings, all of this air will by-pass directly to the delivery chamber 27 so that only air will pass through the outlet 27. By adjustment of the valve 25 by means of the valve stem 36, the valve 25 may be rotated as indicated in FIGS. 4 and 5 of the drawings so that each of the passages through the apparatus are partially open. The air passing through the passage 20 will flow through the discs 37, picking up the anesthetic. The proportion of air, oxygen, or a mixture thereof, is determined by the angular position of the valve 25.

In accordance with the Patent Statutes, I have described the principles of construction and operation of my improvement in Inhalation Anesthesia Device, and while I have endeavored to set forth the best embodiment thereof, I desire to have it understood that changes may be made within the scope of the following claims without departing from the spirit of my invention.

I claim:

1. An inhalation anesthesia device including
    an elongated chamber,
    an end closure at one end of said chamber,
    an end closure at the other end of said chamber,
    a first partition extending across said chamber in spaced relation to said one end closure defining, therebetween, a receiving chamber,
    an inlet to said receiving chamber,
    means supplying pressurized gas to said inlet,
    a second partition in spaced relation to the other end of said chamber defining a delivery chamber therebetween,
    an outlet from said delivery chamber,
    means for connecting said outlet to a patient;
    a by-pass within said elongated chamber extending between said first and second partition connecting said receiving chamber and said outlet chamber,
    a plurality of spaced foraminous absorbent members extending across said elongated chamber between said partitions capable of absorbing anesthetic liquid in said elongated chamber,
    an inlet passage through said first partition,
    an outlet passage through said second partition,
    a flap valve intercepting said by-pass and one of said passages regulating the flow of fluid through said by-pass and through the portion of said elongated chamber between said partitions outwardly of said by-pass and operable to open said by-pass and close said one passage, open said one passage and close said by-pass, or proportion the flow through said by-pass and said one passage.

2. The structure of claim 1 and including a source of oxygen under pressure connected to said receiving chamber to provide at least a portion of said pressurized gas supply.

3. The structure of claim 1 and in which said valve is enclosed within said second partition.

4. The structure of claim 1 and including a flap valve communicating with said receiving chamber capable of opening when a negative pressure is experienced therein.

5. The structure of claim 1 and including baffles extending partially across said elongated chamber acting to direct the flow of fluid toward the bottom of said elongated chamber between said partitions.

6. The structure of claim 5 and in which said baffles are adjacent to, and assist in supporting, said foraminous absorbent members.

7. The structure of claim 1 and including an inlet for liquid anesthetic communicating with the portion of said elongated chamber between said partitions.

8. The structure of claim 1 and in which said elongated chamber is substantially cylindrical.

9. The structure of claim 2 and in which said air pressure supply means and said oxygen source are selectively or simultaneously connected to said receiving chamber.

* * * * *